US007834123B2

(12) United States Patent
Suen

(10) Patent No.: US 7,834,123 B2
(45) Date of Patent: Nov. 16, 2010

(54) TWO COMPONENT POLYURETHANE ADHESIVE

(75) Inventor: Wu Suen, Flemington, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 714 days.

(21) Appl. No.: 11/437,926

(22) Filed: May 19, 2006

(65) Prior Publication Data

US 2007/0270567 A1 Nov. 22, 2007

(51) Int. Cl.
*C08G 18/80* (2006.01)
*C08G 18/08* (2006.01)
*C08G 18/16* (2006.01)
*C08G 18/18* (2006.01)
*C08G 18/22* (2006.01)
*C08G 18/40* (2006.01)
*C08G 18/42* (2006.01)

(52) U.S. Cl. .............................. 528/45; 528/48; 528/52; 528/53; 528/54; 528/58; 528/76; 528/80; 528/85

(58) Field of Classification Search ................... 528/45, 528/48, 52, 53, 54, 58, 76, 80, 85
See application file for complete search history.

(56) References Cited

U.S. PATENT DOCUMENTS

| 2,866,774 | A | * | 12/1958 | Price ............................ 528/77 |
| 3,635,906 | A | * | 1/1972 | Jawawant ..................... 528/58 |
| 3,895,149 | A | * | 7/1975 | Sheffler et al. ................ 428/94 |
| 4,322,327 | A | | 3/1982 | Yoshimura et al. |
| 4,395,528 | A | | 7/1983 | Leiner et al. |
| 4,474,836 | A | * | 10/1984 | Lukoschek et al. ....... 427/389.9 |
| 4,871,854 | A | | 10/1989 | Oberth et al. |
| 6,084,026 | A | * | 7/2000 | Jamasbi ...................... 524/590 |
| 6,124,380 | A | | 9/2000 | Bossert et al. |
| 2006/0069225 | A1 | | 3/2006 | Wintermantel et al. |
| 2006/0180274 | A1 | | 8/2006 | Burckhardt et al. |

FOREIGN PATENT DOCUMENTS

| DE | 108 103 A1 | 5/1974 |
| DE | 108103 A1 | 9/1974 |

* cited by examiner

*Primary Examiner*—Milton I Cano
*Assistant Examiner*—Benjamin J Gillespie
(74) *Attorney, Agent, or Firm*—Steven C. Bauman; James E. Piotrowski

(57) ABSTRACT

A two component polyurethane adhesive composition having one or more polyols as a first component and one or more isocyanates as a second component. The composition also comprises one or more catalysts and one or more blocking agents to delay the curing reaction. The composition provides long open time, improved wet out of the substrates to be bonded, a rapid cure rate and excellent final bond performance at room and elevated temperatures. Optional ingredients, such as fillers, chain extenders and plasticizers may be added as desired. In one embodiment, the catalyst is a tin catalyst such as dibutyl tin dilaurate which may optionally be combined with other catalysts such as tertiary amines. The blocking agent in one embodiment is 8-hydroxyquinoline.

11 Claims, 1 Drawing Sheet

TWO COMPONENT POLYURETHANE ADHESIVE

FIELD OF THE INVENTION

The present invention relates to a two component polyurethane adhesive composition having fast curing speed and an induction period before the initiation of curing.

BACKGROUND OF THE INVENTION

Two component polyurethane adhesive compositions generally comprise components that are liquid or pastes at room temperature before they are mixed together. The first component of the composition comprises a polyol and other ingredients, such as chain extenders, catalysts, blocking agents and other additives as desired. The second component comprises monomeric, polymeric or prepolymer isocyanate. In order to make a bond, the two components of the adhesive are fully mixed together and the composition is then applied to a substrate. The mixed composition then initiates cure and develops bonding strength while transforming into a solid form. The curing reaction takes place between the free isocyanate groups and the active hydrogens from the polyol. If there are excess free isocyanate groups after the main curing reaction, the excess free isocyanate groups are cured by ambient or surface moisture from the substrates.

Two component polyurethane adhesives offer many advantages over single component compositions. One such advantage is that two component adhesives have extremely long shelf lives. Further, such adhesives may be formulated with a wide range of different components. The wide range of components provides end users with great latitude to design different formulations that will meet various end use application requirements.

In formulating two part adhesive compositions, there is often a trade off between a desired rapid cure rate and a desired long open time. The long open time is desirable because it enhances process flexibility and provides good wet out to the substrates to be bonded. The addition of catalysts generally increases the cure speed but also reduces the open time. There is a need in the art for a two part adhesive composition that will provide an induction period between the mixing of the components and the initiation of a rapid cure. The induction period would allow for long open time and good wet out of the substrates. The induction period would also allow for the maximum work life period for the adhesive which would in turn simplify the design of processing equipment. Upon initiation of curing, the rapid cure would provide as fast a process as possible to minimize the processing time.

SUMMARY OF THE INVENTION

The present invention provides a two component polyurethane adhesive composition having one or more polyols as a first component and one or more isocyanates as a second component. The composition also comprises one or more catalysts and one or more blocking agents to delay the curing reaction. The composition provides long open time, improved wet out of the substrates to be bonded, a rapid cure rate and excellent final bond performance at room and elevated temperatures. Optional ingredients, such as fillers, chain extenders and plasticizers may be added as desired.

In one embodiment of the invention, the catalyst is a tin catalyst such as dibutyltin dilaurate which may optionally be combined with other catalysts such as tertiary amines. The blocking agent in one embodiment is an 8-hydroxyquinoline derivative

DETAILED DESCRIPTION OF THE PREFERRED EMBODIMENTS

Figure 1:
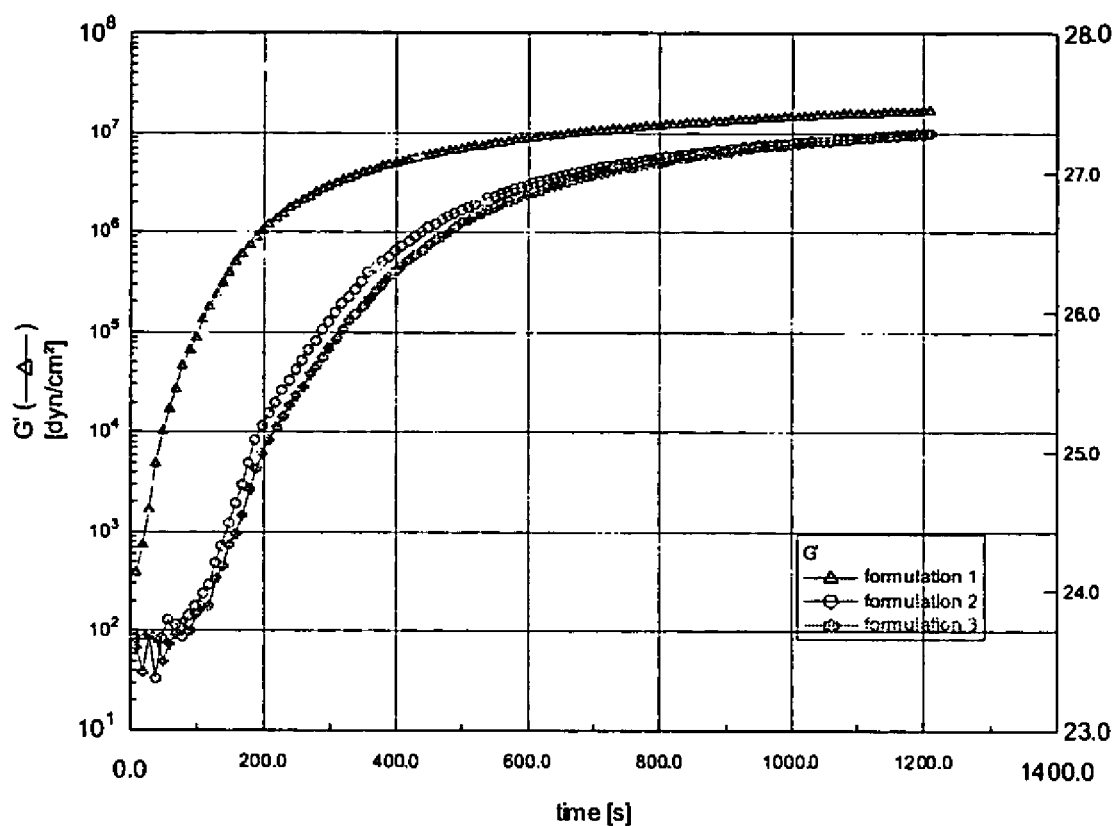
FIG. 1 is a graph of the extent of cure (as indicated by the storage modulus G' increase) as a function of time. Adhesives of the present invention are compared to an existing adhesive.

The present invention is directed to a two component polyurethane adhesive composition comprising one or more polyols as the first component and one or more isocyanates as the second component. The isocyanate component and the polyol component are generally used at an equivalent ratio of about 1:1. The present invention discloses that the addition of one or more blocking agents in conjunction with one or more catalysts provides an induction period between the time of mixing of the components of the adhesive and initiation of cure. The induction period provides numerous processing and performance advantages.

The two component adhesives contain a polyol component and an isocyanate component. To obtain a fully cured network, the equivalent ratio of isocyanate to alcohol is generally 0.9 to 1.25, preferably 1 to 1.2, and most preferably 1.05 to 1.15. A slight excess of isocyanate ensures complete reaction of the polyol. The excess isocyanate will ordinarily become part of the final network through reaction with atmospheric or substrate moisture.

For effective and efficient mixing of the adhesive it is desirable that they have similar viscosities and that the volumes of the two components to be mixed are roughly equal. Since the densities of the two parts are normally similar, equal volumes corresponds to about equal weights of the two parts.

The polyol component of the adhesive composition may comprise one or more of various polyols. Preferably the polyols to be utilized have hydroxyl functionality of at least two and molecular weights in the range of about 500 to about 5000 and include polyester polyols, polyether polyols, polyolefin polyols, polycarbonate polyols and mixtures thereof. The polyols that may be utilized include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, polybutadiene diol, polyisobutylene diol, polycarbonates as well as mixtures thereof. "Polymer polyols" are also suitable, i.e., graft polyols containing a proportion of a vinyl monomer, polymerized in situ, such as Niax 34-28, commercially available from Dow Chemical Company. Additional polyols include polycaprolactone diols and polycarbonate diols. The polyol is typically used in an amount of between 25 weight percent to about 75 weight percent of the entire adhesive composition.

Examples of polyether polyols include linear and/or branched polyethers having hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexanediol-1, 3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

Examples of polyester polyols include unsaturated polyester polyols having at least one ethylenically unsaturated group per molecule and predominantly hydroxyl end groups and preferably an acid number less than five. The polyester polyol may be prepared from an oligomer of an alpha, beta-ethylenically unsaturated dicarboxylic acid compound obtained by the condensation reaction of one or more of a saturated di- or polycarboxylic acid or anhydride with an excess of glycols or polyhydric alcohols. The unsaturated polyester polyol can also be prepared from unsaturated di- or polycarboxylic acid(s) or anhydride(s) with an excess of glycols and/or polyhydric alcohol(s). The polyols used in this invention preferably have an acid number less than five, and most preferably less than about two.

Examples of suitable saturated di- or polycarboxylic acids include isophthalic, orthophthalic, terephthalic, adipic, succinic, sebacic acid and mixtures thereof, with adipic acid being preferred. Typical unsaturated carboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of glycols and polyhydric alcohols which are useful in the invention include neopentyl glycol, ethylene glycol, diethylene glycol, triethylene glycol, propylene glycol, dipropylene glycol, 1,4-butanediol, polyethylene glycol, glycerol, mannitol, 1,propanediol, pentaerythritol, 1,6-hexanediol, 1,3-butanediol and mixtures thereof. A preferred polyol is the polyester obtained by reacting adipic acid with an excess of diethylene glycol.

A number of suitable polyols are commercially available. Non-limiting examples include polyethers such as ARCOL PPG 2025 (Bayer), PolyG 20-56 (Arch) and Pluracol P-2010 (BASF), polyesters such as Dynacoll 7360 (Degussa), Fomrez 66-32 (Crompton), Rucoflex S-105-30 (Bayer) and Stepanpol PD-56 (Stepan), and polybutadiene such as PolyBD R-45HTLO (Sartomer). The preferred polyols are polyester polyol Desmophen S1011-35, and Desmophen F-207 (both available from Bayer).

The isocyanate component of the adhesive composition comprises one or more of various suitable polymeric, monomeric or prepolymeric isocyanates. Suitable diisocyanates include ethylene diisocyanate; 1,4-tetramethylene diisocyanate; 1,4 and/or 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane; 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-toluene diisocyanate and mixtures of these isomers; diphenyl methane-2,4'- and/or 4,4'-diisocyanate; naphthylene-1,5-diisocyanate; 1,3- and 1,4-xylylene diisocyanate, 4,4'-methylene-bis(cyclohexyl isocyanate), 4,4'-isopropyl-bis(cyclohexyl isocyanate), 1,4-cyclohexyl diisocyanate and 3-isocyanatomethyl-3,5,5-trimethylcyclohexyl isocyanate (IPDI); 2,4- and 2,6-toluene diisocyanate; diphenylmethane diisocyanate; hexamethylene diisocyanate; dicyclohexyl-methane diisocyanate; isophorone diisocyanate; 1-methoxy-2,4-phenylene diisocyanate; 1-chlorophenyl-2,4-diisocyanate; p-(1-isocyanatoethyl)-phenyl isocyanate; m-(3-isocyanatobutyl)-phenyl isocyanate and 4-(2-isocyanate-cyclohexyl-methyl)-phenyl isocyanate, isophorone diisocyanate, toluene diisocyanate and mixtures thereof.

It is also possible to use aliphatic or aromatic diisocyanates of the type which are obtained by reacting excess diisocyanate with polyfunctional compounds containing hydroxyl or amine groups and which, in practical polyurethane chemistry, are referred to either as "modified isocyanates" or as "isocyanate prepolymers". A preferred isocyanate component is a isocyanate prepolymer Vorite 689 derived from castor oil (available from Caschem Company).

The catalyst utilized in the composition comprises at least one catalyst which is preferably a tin or organotin catalyst. The catalyst may comprise from about 0.001 to about 1 weight percent of the adhesive and preferably comprises in the range of about 0.01 to about 0.1 weight percent of the adhesive. The tin compounds that may comprise part of the present catalyst compositions are conventional catalysts for the reaction of hydroxyl-containing organic molecules with isocyanates to form urethane groups. Representative members of this class of tin compounds include stannous salts of carboxylic acids, organostannonic acids such as butylstannonic acid, organothiostannonic acids, diorganotin oxides such as dibutyltin oxide, diorganotin sulfides, mono- and diorganotin halides such as dimethyltin dichloride, mono- and diorganotin carboxylates such as dibutyltin dilaurate, dibutyltin adipate and dibutyltin maleate, mono- and diorganotin mercaptides such as dibutyltin bis(lauryl mercaptide), mono- and diorganotin derivatives of mercaptocarboxylic acid esters and mercaptoalkanol esters such as dibutyltin-S,S'-bis(isooctyl mercaptoacetate) and dibutyltin S,S'-bis(mercaptoethyl stearate), diorganotin oxides such as dibutyltin oxide and mono- and diorganotin derivatives of .beta.-diketones such as dibutyltin bis-acetylacetonate. The preferred catalyst is Dibutyltin Dilaurate.

Additional catalysts that can be used include organometallic catalysts, among others. Some examples of suitable organometallic catalysts include organometallic compounds of lead, iron, bismuth, mercury, zirconium, titanate, zinc, cobalt and the like. The use of a delayed action catalyst such as an iron pentanedione or a bismuth carboxylate, as described in U.S. Pat. No. 4,611,044, herein incorporated by reference, is also possible.

The composition may also contain a tertiary amine catalyst. The purpose of the tertiary amine catalyst is to activate the isocyanate group to nucleophilic substitution to promote the reaction with water to give carbon dioxide generation and to react with the polyhydroxyl compound to give urethane formation. Examples of tertiary amine catalysts include N,N-dimethylaminoethanol, tris(dimethyl aminopropyl) amine, N,N-dimethylcyclohexylamine, bis-(2-methyl aminoethyl) ether, N,N-dimethylbenzylamine, diaminobicyclooctane, triethylamine, tributylamine, N-methylmorpholine, N-ethyl-morpholine, N-coco-morpholine, N,N,N',N'''-tetramethyl-ethylene-diamine, 1,4-diaza-bicyclo-(2,2,2)-octane, N-methyl-N'-dimethyl-amino-ethylpiperazine, N,N-dimethylbenzylamine, bis-(N,N-diethyl-aminoethyl)-adipate, N,N-diethylbenzylamine, pentamethyl-diethylenetriamine, N,N-dimethyl-cyclohexylamine, N,N, N',N'-tetramethyl-1,3-butanediamine, N,N-dimethyl-.beta.-phenylethylamine, 1,2-dimethyl-imidazole, 2-methylimidazole and mixtures thereof. Also useful are the commercially available tertiary amines such as Niax A-1, available from WITCO; Thancat DD, available from Huntsman; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol and silaamines having carbon-silicon bonds as described, e.g., in German Patent No. 1,229,290 and U.S. Pat. No. 3,620, 984, may also be used as catalysts. Examples include 2,2,4-trimethyl-2-silamorpholine and 1,3-diethylamino-ethyltetramethyl-disiloxane. Delayed action catalysts such as NIAX A-300, NIAX A400, NIAX-107, DABCO 8154, DABCO DC-1 and DABCO DC-2 may also be used. The preferred tertiary amine catalyst is 1,4-diaza-bicyclo-(2,2,2)-octane, available as DBACO 33-LV from Air Products Company (33% triethylenediamine in dipropylene glycol)

One or more blocking agents are utilized to provide an induction period between the mixing of the two parts of the adhesive composition and the initiation of the cure. The blocking agent preferably has the structure

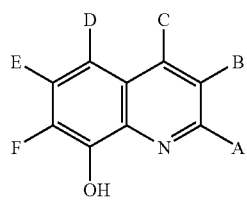

wherein A, B, C, D, E and F may be one or a combination of chemical groups including, but not limited to, hydrogen, alkyl or halogen.

Blocking agents having this structure include 8-hydroxyquinoline (where A through F are all Hydrogen) and its derivatives. The addition of the blocking agents provides an induction period which causes a reduction in the curing rate immediately after mixing of the components of the adhesive. The reduction in the curing rate results in lower initial tensile shear strengths and storage moduli immediately after mixing than those found in compositions that do not contain a blocking agent. Following the induction period the adhesive quickly cures so that the tensile shear strength and storage modulus are similar to those produced by adhesives that do not contain the blocking agent. The blocking agent comprises in the range of about 0.001 to about 10 weight percent of the adhesive and preferably comprises in the range of about 0.01 to about 0.5 weight percent of the composition.

Chain extenders may optionally be added to the two part adhesive composition of the present invention. These include low molecular weight diols and polyols, such as ethylene glycol, propylene glycol, 1,4-butanediol, diethylene glycol, hexane diol, trimethyol propane, glycerol, hydroxyl-terminated polyethylene oxide (polyethylene glycol), glycerin and mixtures thereof. One preferred chain extender useful in the present invention is ethylene glycol. Other common chain extenders which may be used in the invention include diamines and polyamines that, when blended with the polyol component and reacted with the isocyanate component, will not phase separate from the compositions. Examples of such amine compounds are ethylenediamine, polyoxypropylene diamine, 1,2- and 1,4-diaminocyclohexane in tans-, cis- or their mixture, dimethyldiaminodicyclohexylmethane, and 1,2-propanediamine. Still other chain extenders which may be used in the invention include amine containing alcohols or low molecular weight polyols. Examples are monoethanol amine, diethanol amine, and triethanol amine, tetra(2-hydroxypropyl) ethylenediamine available as Quadrol polyol (BASF Corporation).

Such chain extenders provide several benefits to the compositions of the invention including reaction with the isocyanate to improve flexibility, impact resistance and reaction rate. Chain extenders comprise in the range of about 0 to about 20 weight percent of the composition, and preferably from about 3 to about 15 weight percent of the composition.

Optionally, fillers, fibers, plasticizers, pigments, colorants, flame retardants, processing aids such as thixotropic agents and internal lubricants, all of which are well known to those skilled in the art, can be added to the two part adhesive composition of the invention. Various organic or inorganic fillers or fibers can be added to reduce the exotherm of the reaction of the two components, provide physical reinforcement, and/or reduce its cost. Fillers include such materials as talc, calcium carbonate, silica beads, calcium sulfate, aluminum trihydrate, ammonium polyphosphate, etc., with calcium carbonate and aluminum trihydrate and mixtures thereof being preferred in the invention. The amounts of filler or other additives will vary depending on the desired application.

The invention can be further described by the following non-limiting examples.

EXAMPLES

Various formulations of two component polyurethane adhesives were prepared according to the following method. To prepare the first component (part A), the desired amount of polyol(s) were charged into a clean reactor and the composition was mixed well. Vacuum and heat were applied to the reactor, with the vacuum continuing for 1 hour after the reactor content reaches 225° F. The vacuum was then broken and the chain extender, catalysts, and 8-hydroxyquinoline were charged into the reactor in the desired amount while mixing. Mixing was continued for another 20 minutes after the addition of all of the ingredients, after which the reactor's contents were discharged into another clean container and cooled to room temperature. At this point, part A was ready for use in the two part adhesive. For storage purposes, the container should be purged with dry nitrogen before sealing. The second component (part B) is urethane prepolymer. For the purpose of these examples, Vorite 689 isocyanate (commercially available from Caschem) with an isocyanate content of 17% was utilized.

The part A compositions of three formulations are shown in Table 1. As shown in Table 1, comparative formulation 1 and formulations 2 and 3 are similar compositions except for the amount of the 8-hydroxyquinoline blocking agent.

TABLE 1

Composition of part A of two component polyurethane formulation

| Ingredient (all wt %) | 1 | 2 | 3 |
|---|---|---|---|
| Dibutyl tin dilaurate | 0.05 | 0.05 | 0.05 |
| DABCO 33-LV | 0.4 | 0.4 | 0.4 |
| 8-hydroxyquinoline | 0 | 0.05 | 0.15 |
| ethylene glycol | 9.5 | 9.5 | 9.5 |
| Desmophen S1011-35 | 44.25 | 44.25 | 44.25 |
| Desmophen F-207 | 44.25 | 44.25 | 44.25 |

N.B. DABCO 33-LV is commercially available from Air Products Company.
Desmophen S1011-35 is commercially available from Bayer Material Sciences
Desmophen F-207 is commercially available from Bayer Material Science.

Formulations 1-3 were tested for physical and performance properties. Key performance properties for the two component liquid polyurethane adhesives include viscosity, curing reaction rate, which relates to open time, and strength properties at ambient conditions and elevated temperature (heat resistance). The curing reaction rate is measured by tensile lap shear test as a function of time immediately after the bond was made. The strength properties are measured by tensile lap shear and cleavage peel tests at ambient conditions on samples that have been cured and conditioned for 5 days. The heat resistance is measured by conditioning the 5-day cured sample at 80° C. for half an hour and testing immediately by tensile lap shear.

Before any performance tests were performed, each of the two components of the adhesive was loaded in an equal amount into separate compartments in the same cartridge and sealed at both ends. The cartridge was then loaded into a cartridge-gun and a mixing tip was installed on the front end. By application of constant pressure on the trigger, the two components were pushed into the mixing tip to ensure sufficient mixing before application to the substrate.

Viscosity was tested on a Brookfield DV-1+ viscometer using a #27 spindle at ambient temperature.

Two types of samples were made for tensile lap shear test and cleavage peel test. The substrates were rigid plastics of ABS and acrylic with thickness of 0.1 inch. Substrates were cut into 1"×4" in size for tensile test, and 1"×6" in size for cleavage peel test.

Tensile lap shear test was based upon ASTM D3163-01 Standard Test Method for Determining Strength of Adhesively Bonded Rigid Plastic Lap-Shear Joints in Shear by Tension Loading. The bond overlapping area was 1"×1" with a bond thickness of 40 mil.

The cleavage peel test was based upon ASTM D38-7-98 Standard Test Method for Strength Properties of Adhesives in Cleavage Peel by Tension Loading. The bond overlapping area was 1"×3" with a bond thickness of 24 mil.

Table 2 shows the physical and performance properties of the formulations described in Table 1. Compared to comparative formulation 1, both formulation 2 and 3 have a light green color due to addition of a small amount of 8-hydroxyquinoline.

TABLE 2

Effect of 8-hydroxyquinoline on curing speed and final bond performance.

| | Formulation | | |
|---|---|---|---|
| | 1 | 2 | 3 |
| appearance | cloudy, milky white | cloudy, light green | cloudy, light green |
| viscosity (cps) | 6313 | 6350 | 6188 |
| clarity of cured adhesive | very slightly cloudy | clear, colorless | clear, colorless |
| tensile lap shear at | | | |
| 10 min | 49.7 | 7.1 | 0 |
| 15 min | 126 | 56.1 | 26.4 |
| 20 min | 163 | 149.6 | 86.1 |
| 25 min | 208* | 184.2* | 156.5 |
| after curing for 5 days | | | |
| tensile lap shear (r.t.) | 541 | 439 | 468 |
| tensile lap shear (80° C.) | 143 | 206 | 141 |
| cleavage peel (r.t.) | 17.9 | 20.6 | 20.7 |

Substrates were ABS and acrylic panel.
All bond testing results were in PSI (pound per square inch).

Failure modes in the curing rate test were all cohesive failure except those marked with an asterisk which indicates adhesive failure to acrylic substrate. The failure modes in all 5 day results were adhesive failure to acrylic substrate. The curing reaction rate in formulation 1 was too fast for many processing applications. Within 10 minutes after being mixed and applied to make the bond, the adhesive changed from a liquid state into a solid state and developed a lap shear strength of 49.7 psi. The lap shear strength of formulation 1 quickly increased over the next 15 minutes. The very fast setting of comparative formulation 1 would only allow a short open time for bond assembly. In comparison, formulation 2 had a slower strength development. The lap shear strength tests of formulations 2 and 3 clearly indicate the induction period between application and cure. The lap shear strength of formulation 2 was only 7.1 psi after 10 minutes of curing which is significantly less than the strength of formulation 1 over the same period of time. At 15 minutes, the lap shear strength of formulation 2 increased to 56.1 psi, which is still significantly less than the strength of formulation 1 at the same time. However, the bond strength of formulation 2 quickly increased over the next 5 minutes. The lap shear strength was 149.6 psi at 20 minutes and 184.2 psi at 25 minutes of curing which is comparable to the lap shear strengths of formulation 1 at the same time intervals. The delayed curing profile having an induction is preferred for many applications which require maximum open time and work life for the adhesive. In formulation 3, the curing reaction was further delayed because more blocking agent was added. Consequently, by adding a small amount of 8-hydroxyquinoline as a blocking agent, the adhesive's curing rate and bond strength development are effectively delayed at the initial stage after mixing, and then quickly increased to a level comparable to the formulation without the blocking agent.

The final performance properties of the adhesives containing a blocking agent were in heat resistance and cleavage peel tests. As illustrated in Table 2, formulations 2 and 3 provide good final performance properties in shear resistance, cleavage peel and tensile lap shear tests. Both formulations containing a blocking agent exceeded the generally desired tensile lap shear strength of 200 psi after five days of curing.

The curing reaction rate of the adhesive can also be measured by rheology measurement of storage modulus (G') as a function of time after the 2 parts were mixed. The test incorporates a Dynamic Time Sweep test in a ARES-M rheometer. The liquid adhesive is extruded onto parallel plates 25 mm in diameter with a 1 mm gap between the plates maintained throughout the test while the temperature is maintained at 25° C. A measurement is taken every 10 second when an oscillatory shear is applied at 1% strain at a frequency of 10.0 rad/second. The total time is 1200 second (20 minutes) per run.

An example of storage modulus (G') as a function of curing time is shown in FIG. 1. The G' of formulation 1 quickly builds up from the initial onset of the curing reaction, and started to reach a plateau after 15 minutes. However, for formulations 2 and 3 with 8-hydroxyquinoline as a blocking agent, the G' increases at much slower rate at its initial stage, and then starts to increase at a much faster rate afterward. At 20 minutes after curing, the G' had increase to a level that is comparable to that of formulation 1. Thus the overall effect of adding blocking agents such as 8-hydroxyquinoline derivatives is that there is an induction period at the initial stage but the curing rate quickly increases after an induction period.

COMPARATIVE EXAMPLES

Formulations 4, 5 and 6 were formulated according to the same process as formulations 1, 2 and 3. The part A compositions of formulations 4, 5 and 6 are shown in Table 3.

TABLE 3

Part A composition for formulation 4, 5 and 6

| Ingredient (all wt %) | 4 | 5 | 6 |
|---|---|---|---|
| DBTDL | 0.08 | 0 | 0 |
| DABCO 33-LV | 0 | 0.12 | 0.5 |
| Coscat 83 | 0 | 0 | 0.08 |
| 8-hydroxyquinoline | 0 | 0 | 0 |
| ethylene glycol | 9 | 10 | 8 |
| Desmophen S1011-35 | 87 | 90 | 45 |
| Desmophen F-207 | 0 | 0 | 43 |
| Atlas G-1672 | 4 | 0 | 4 |

Atlas G-1672 is polyoxypropylene bisphenol A, commercially available from Uniqema
Coscat 83 is a Bismuth catalyst, commercially available from Caschem Inc.

The physical and performance properties of comparative formulations 4, 5 and 6 were tested in the same manner as formulations 1, 2, and 3 and the results are shown in Table 4.

TABLE 4

Comparative Test Results

| | Formulation | | |
|---|---|---|---|
| | 4 | 5 | 6 |
| appearance | cloudy | cloudy | clear |
| viscosity (cps) | 7900 | 7875 | 6500 |
| clarity of cured adhesive | slight hazy | cloudy | clear |
| tensile lap shear at | | | |
| 10 min | 3.6 | 3 | 80 |
| 15 min | 5.1 | 8 | 128 |
| 20 min | 8 | 14 | 156 |
| 30 min | 12.8 | 49 | 227 |
| 40 min | 25.1 | 121 | N/A |
| 60 min | 60 | 174 | N/A |
| after curing for 5 days | | | |
| tensile lap shear (r.t.) | 549 | 487 | 616 |
| tensile lap shear (80° C.) | 128 | 150 | 131 |
| cleavage peel (r.t.) | 6.9 | 13 | 20 |

The curing reaction rate of comparative formulation 4 was very slow throughout, especially as compared to formulation 2, and its lap shear test at 60 minutes only reached 60 PSI. The curing reaction rate of formulation 5 was slightly faster, but still not sufficient for a quick bond making process. While formulation 6 had very fast curing rate, its lap shear strength reached 80 psi at only 10 minutes of bonding. The result would be a very short open time for bond making. Therefore, none of the comparative formulations can give desirable curing rate as those in formulation 2 and 3.

Many modifications and variations of this invention can be made without departing from its sprit and scope, as will be apparent to those skilled in the art. The specific embodiments described herein are offered by way of examples only, and the invention is to be limited only by the terms of the appended claims, along with the full scope and equivalents to which such claims are entitled.

I claim:

1. A two component polyurethane adhesive composition comprising a first and a second component wherein
the first component comprises
one or more polyols,
one or more catalysts comprising a mixture of an organo tin catalyst present in an amount from 0.01 to 0.1 weight percent, and one or more tertiary amines present in amounts from about 0.001 to about 1 weight percent, based on the weight of the adhesive composition, and
one or more blocking agents present in amounts from about 0.01 to about 0.5 weight percent, based on the weight of the polyol solids in the adhesive composition and having the structure

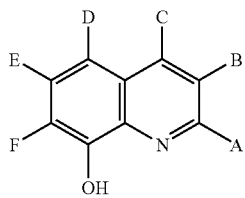

wherein A, B, C, D, E and F are independently selected from the groups consisting of hydrogen, alkyl and halogen; and
the second component comprises one or more isocyanates.

2. The adhesive of claim 1, wherein the blocking agent is 8-hydroxyquinoline.

3. The adhesive of claim 1, wherein the catalyst is dibutyltin dilaurate.

4. The adhesive of claim 1, wherein at least one of the one or more polyols have a hydroxyl functionality of at least two and molecular weights in the range of about 500 to about 3000.

5. The adhesive of claim 4, wherein the one or more polyols are selected from the group consisting of polyester polyols, polycarbonate polyols, polyolefin polyols and mixtures thereof.

6. The adhesive of claim 1, wherein the one or more polyols comprise in the range of about 25 weight percent to about 75 weight percent of the adhesive.

7. The adhesive of claim 1, wherein the one or more isocyanate is selected from the group of prepolymeric isocyanate, polymeric isocyanate, monomeric isocyanate and mixtures thereof.

8. The adhesive of claim 1, wherein said first component further comprises one or more chain extenders.

9. The adhesive of claim 8, wherein the one or more chain extenders are selected from the group consisting of low molecular weight diols, diamines and amine containing alcohols, low molecular weight polyols, polyamines and amine containing polyols, ethylene glycol, propylene glycol, 1,4-butanediol, diethylene glycol, dipropylene glycol, hexane diol, trimethyol propane, glycerol, hydroxyl-terminated polyethylene oxide (polyethylene glycol), ethylene diamine, polyoxypropylene diamine, monoethanol amine, diethanol amine, and triethanol amine, tetra(2-hydroxypropyl) ethylenediamine, and mixtures thereof.

10. The adhesive of claim 9, wherein the one or more chain extenders comprise in the range of about 3 to about 15 weight percent of the adhesive.

11. The adhesive of claim 1, wherein the one or more blocking agents are present in amounts from about 0.01 to about 0.2 weight percent, based on the weight of the polyol solids in the adhesive composition.

* * * * *